United States Patent
Ambrose et al.

(10) Patent No.: US 8,278,692 B2
(45) Date of Patent: Oct. 2, 2012

(54) SOFT ERROR REDUCTION CIRCUIT AND METHOD

(75) Inventors: Vinod J. Ambrose, Northborough, MA (US); Jeffrey D. Pickholtz, Marlborough, MA (US); Randy L. Allmon, North Grafton, MA (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 12/589,331

(22) Filed: Oct. 22, 2009

(65) Prior Publication Data

US 2011/0095340 A1    Apr. 28, 2011

(51) Int. Cl.
*H01L 29/78*    (2006.01)
(52) U.S. Cl. .................. 257/288; 257/297; 257/E29.255
(58) Field of Classification Search .................. 257/288, 257/297, E29.255
See application file for complete search history.

(56) References Cited

U.S. PATENT DOCUMENTS

| | | | |
|---|---|---|---|
| 2002/0181273 A1* | 12/2002 | Nii et al. | 365/154 |
| 2009/0106715 A1* | 4/2009 | Pikus | 716/5 |
| 2009/0204933 A1* | 8/2009 | Rezgui | 716/10 |

OTHER PUBLICATIONS

"Soft Errors in Electronic Memory," A white paper by Tezzaron Semiconductor, Version 1.1, Jan. 5, 2004, pp. 1-7.
"Soft Error," Article retreived from Wikipedia on Dec. 5, 2011, Nov. 30, 2011, 6 pages.
Mitra, et al., "Logic Soft Errors in Sub-65nm Technologies Design and CAD Challenges," Proceedings of the 42nd annual Design Automation Conference, Jun. 13-17, 2005, ACM, pp. 2-4.
Agny, et al., "The Intel Itanium Processor 9300 Series—A Technical Overview for IT Decision-Makers," A white paper by Intel Corporation, 2010, 16 pages.

* cited by examiner

*Primary Examiner* — Marc Armand
(74) *Attorney, Agent, or Firm* — Blakely, Sokoloff, Taylor & Zafman LLP

(57) ABSTRACT

In some embodiments, complementary charge-collecting diffusions (transistor diffusions, e.g., drain or source areas) are disposed close to each other. In some embodiments, dummy ("off") transistors are incorporated to bring complementary diffusions (diffusions of the same charge type and having complementary digital logic levels) closer to each other than otherwise might be possible and thus, to enhance common-mode charge collection for the complementary diffusion areas.

21 Claims, 3 Drawing Sheets

SOFT ERROR REDUCTION CIRCUIT AND METHOD

BACKGROUND

Soft errors occur in logic circuit nodes (e.g., timing logic, arithmetic circuits), in storage circuit nodes (e.g., register files, sequentials, latches, RAM cells), and in other circuits having digital nodes, as a result of ambient radiation impacting the transistors that make up the circuits. For example, they can cause a stored '1 to become a '0 and a stored '0 to become a '1. Unfortunately, reducing Soft Error Rates (SER) in contemporary integrated circuits such as processors can be costly in terms of power and area. For example, typical state element radiation hardening methodologies (e.g., using redundant circuitry) may have a greater than 2× power and area cost. Current radiation hardening approaches generally depend on redundant storage, and interlocking schemes. Such approaches tend to be inherently costly, both because of increased transistor count, and the need for physical separation of vulnerable diffusions. Accordingly, new design approaches that are less area and power costly are desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In some embodiments, complementary charge-collecting diffusions (transistor diffusions, e.g., drain or source areas) are disposed close to each other. In some embodiments, dummy ("off") transistors are incorporated to bring complementary diffusions (diffusions of the same charge type and having complementary digital logic levels) closer to each other than otherwise might be possible and thus, to enhance common-mode charge collection for the complementary diffusion areas.

Figure 1:
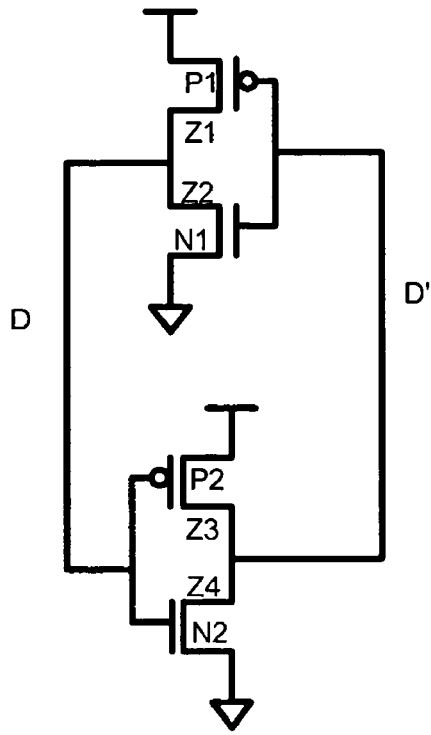
FIG. 1 shows a memory cell schematic with first and second cross-coupled inverters.

FIG. 1 shows a storage cell typically found in sequentials, register files, and/or SRAM. The storage cell typically has a pair of cross-coupled inverters, as shown in the figure, wherein a first inverter is formed from PMOS transistor P1 and NMOS transistor N1, while the second inverter is formed from PMOS transistor P2 and NMOS transistor N2, cross-coupled together as shown. In operation, when at a stable, storage state, each inverter will have one on and one off transistor. For example, with the cell of FIG. 1, when D is '1 (and thus D' is '0), P1 is on and N1 is off. At the same time, P2 will be off and N2 will be on. When D is '0 and D' is '1, the opposite is true. P1 is off, N1 is on, P2 is on and N2 is off.

Ambient radiation can cause the diffusion regions for each transistor to collect ionizing-particle-induced charge, positive charge for the PMOS diffusions and negative charge for the NMOS diffusions. With the depicted circuit, the sources diffusions are not problematically affected since they are coupled to VCC (PMOS devices) or to VSS (NMOS devices). However, for each inverter, the drain diffusions for turned off transistors can collect charge, negative charge reducing the voltage for the NMOS drain diffusions and positive charge increasing it for the PMOS drain diffusions. Thus, for each inverter, the OFF device may facilitate adverse charge collection because it can adversely disrupt the stored state. For example, assume that D is '1 (P1 ON, N1 OFF, P2 OFF, and N2 ON), negative charge will adversely collect at N1's drain diffusion region (Z2) and positive charge adversely collects at P2's drain diffusion region (Z3). The negative charge at Z2 tends to lower the voltage of D, while the positive charge at Z3 tends to increase the voltage of D'. If sufficient charge is collected in this manner by either or both diffusions, the state of this element can flip, e.g., D changing from '0 to '1 and D' changing from '1 to '0.

On the other hand, the ON devices may collect charge that would reinforce the stored state. (Thus, ON device diffusion charge collection is referred to as reinforcing charge collection.) Thus, with the present example, Z1 may collect positive charge, reinforceably pulling up the '1 at D, and negative charge may collect at Z4, reinforceably bringing down the '0 at D'. This phenomena has been observed and appreciated by the inventors so that if the charge generated from particle strikes collecting in a reinforcing diffusion area is sufficiently close to charge formed in an associated adverse diffusion area (for a group of complementary diffusion areas such as Z1/Z3 or Z2/Z4), the charge in the reinforcing area can counteract against the adverse charge collection and thus inhibit the problematic effects of adverse charge collection. The critical charge ($Q_{crit}$) at the adverse diffusion area needed to upset the stored state is thereby increased, which reduces the FIT (failure in time) rate. Accordingly, in some embodiments, provided are methods of reducing the FIT rate by positioning complementary diffusion areas sufficiently close to one another to increase the likelihood that they will be subjected to comparable radiation so that reinforcing charge collection can counteract against the detrimental effects of adverse charge collection.

Figure 2:
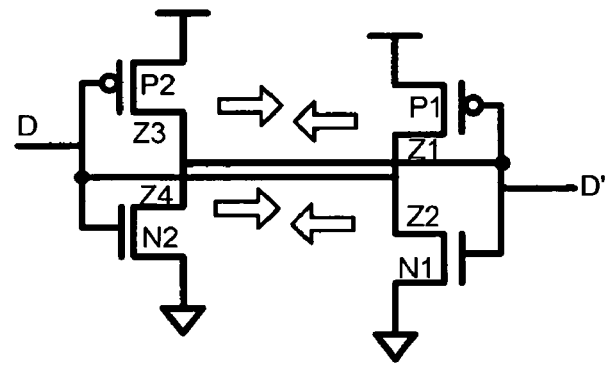
FIG. 2 illustrates a physical arrangement of the schematic of FIG. 1 but indicating improved soft error rate through a complementary diffusion area charge sharing technique.

With reference to FIG. 2, a general principle for achieving complementary charge collection is represented, wherein complementary diffusion regions are disposed close (e.g., as close as is feasible) to one another. Thus, with FIGS. 1 and 2, Z1 should be disposed close to Z3, and Z2 should be disposed closer to Z4. By doing so, it becomes statistically more likely that the reinforcing diffusion regions will receive comparable charge inducing radiation to their counterpart adverse diffusion regions and thus, cut against their detrimental effects. (As used herein, complementary diffusions, complementary diffusion regions, or complementary diffusion areas are diffusion regions that collect the same type of charge and whose digital logic levels are complementary with each other. They could include two or more separate diffusion regions, i.e., they could include more than two regions, although any group of closely disposed complementary diffusions should have sufficient charge offset capability, even if there is an imbalance of adverse to reinforcing diffusions. It may be noted that the terms adverse and reinforcing, as used in this context, are somewhat liquid in that a diffusion may be adverse for one state while reinforcing for the other state.)

Depending on particular design process parameters or circuit configurations, the OFF devices' diffusion may be reverse biased, at least more so than for the ON devices, making them efficient collectors of particle-induced charge relative to the ON devices. The ON devices may have no (or little) externally applied reverse bias, limited to built-in potential, making them relatively weak collectors. However, even this weak collection can serve to increase critical charge level. Furthermore, once adverse regions begin collecting adverse charge, the electric field across their diffusions' depletion region quickly collapses, making them weaker charge collectors. At the same time, the reverse bias across the reinforcing diffusion increases, making their depletion regions widen and thus increasing their electric fields. As a result, the reinforcing diffusion's collection efficiency increases.

Figure 3:
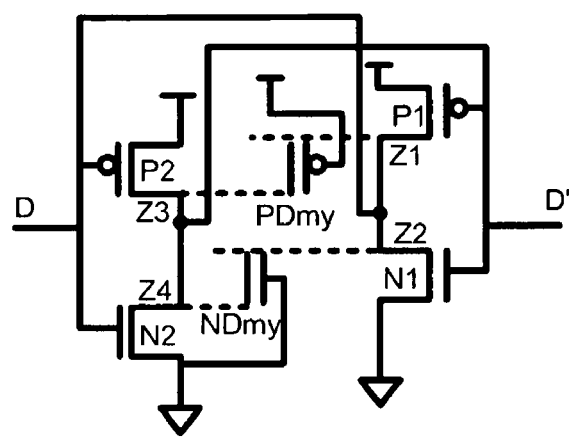
FIG. 3 illustrates an approach for bringing complementary diffusion areas closer to one another for enhanced SER reduction.
Figure 4:
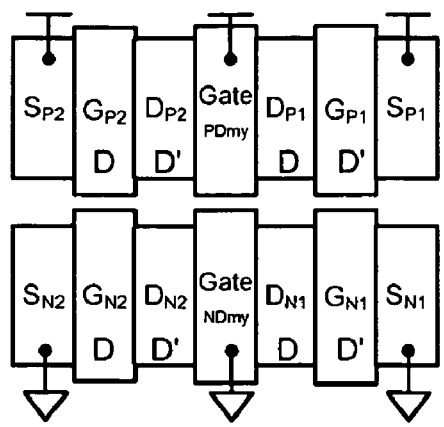
FIG. 4 is a layout showing dummy transistors within transistors having complementary diffusion areas.

Some conventional circuits, e.g., cross-coupled structures, may already have complementary diffusion regions relatively close to each other. However, it has been observed that if they are brought even closer to each other (e.g., to within minimum process dimensions such as to within 32 nM for a 32 nM process), soft error rates may be significantly reduced. Many commonly implemented integrated circuit design processes require that transistor diffusion regions—including drains and sources—be spaced a minimum distance apart from one another. For example, in a so-called 32 nM process, where the smallest feature sizes are around 32 nM, transistor diffusions for separate transistors may need to be at least 50 or 60 nM apart from one another. With reference to FIGS. 3 and 4, it has been appreciated, however, that this spacing limitation may be further improved (i.e., the spacing may be reduced) through the inclusion of a so-called dummy device (OFF device) disposed (or positioned) between complementary diffusions.

FIG. 3 shows the cross-coupled inverters from FIGS. 1 and 2 but with dummy devices (NDmy and PDmy) disposed, respectively, between the NMOS and PMOS transistor pairs so that the complementary diffusion areas are positioned more closely to one another. The dummy devices are actually gates, configured to share a common diffusion with its corresponding transistor pair. Thus, in this circuit, the NDmy device is an NMOS transistor with one of its diffusions used for the drain of N1 and its other diffusion used as the drain of N2. Similarly, the PDmy device is a PMOS transistor with one of its diffusions used as the drain of P1 and the other used as the drain for P2. The dummy gates are coupled to appropriate supplies so that they do not affect the functional operation of the circuit.

FIG. 4 shows a portion of a layout for transistor placement of the transistors and dummy devices from FIG. 3. (for convenience, interconnections are not shown.) It shows the sources and gates ($S_{N1}$, $S_{N2}$, $S_{P1}$, $S_{P2}$, $G_{N1}$, $G_{N2}$, $G_{P1}$, $G_{P2}$) from transistors N1, N2, P1, and P2, along with the dummy devices (Gates NDmy and PDmy). The dummy devices are sandwiched between complementary diffusions. Thus, the dummy devices can be thought of as simply gates or as transistors, which share diffusions with adjacent transistors. The dummy gates are coupled to appropriate supplies so that they do not affect operation of the circuit.

It should be appreciated that while complementary diffusion areas have been shown for like-charge nodes in cross-coupled inverters, there may be many other circuits where such complementary diffusions exist. For example, with many memory cells such as those shown in FIGS. 1-3, pass gates, comprising parallel coupled-together NMOS and PMOS transistors, may be used to provide controllable access to their data nodes.

Figure 6:
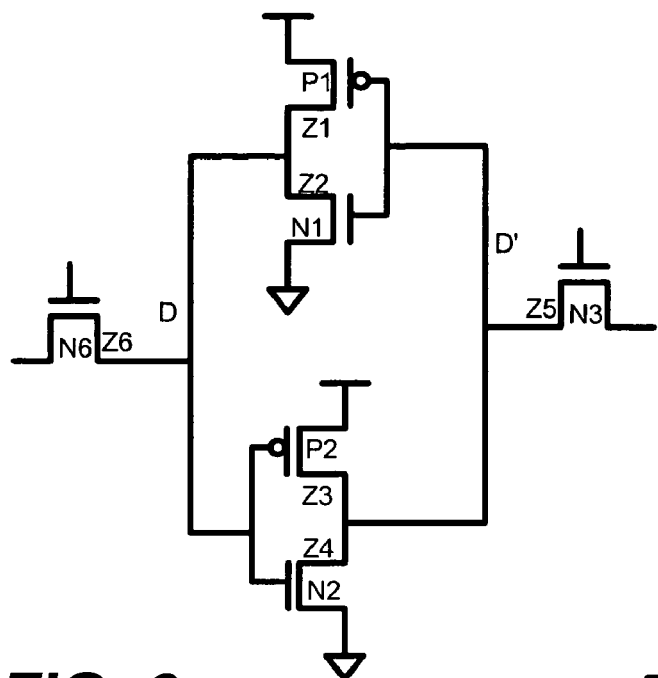
FIG. 6 shows a memory cell with pass gates having complementary diffusions in accordance with some embodiments.

An example of a cell with pass gates (N3, N4) is shown in FIG. 6. In such cases, the complementary N devices would have complementary diffusions where Z4 and Z5 would be complementary with Z2 and Z6. They could be disposed closely in any suitable manner. For example, Z2 could be disposed close to Z4, and Z5 could be positioned close to Z6, or Z4 could be positioned close to Z6 and Z5 positioned close to Z2, or they could all be disposed proximal to each other. Dummy devices may or may not be used to achieve such positioning. For example, if Z2 is disposed next to Z4 and Z5 next to Z6, a dummy gate could be disposed between Z2/Z4 and another dummy gate could be positioned between Z5/Z6. The PMOS diffusions could also be positioned next to each other, as discussed above, with Z1 positioned next to Z3.

Figure 7:
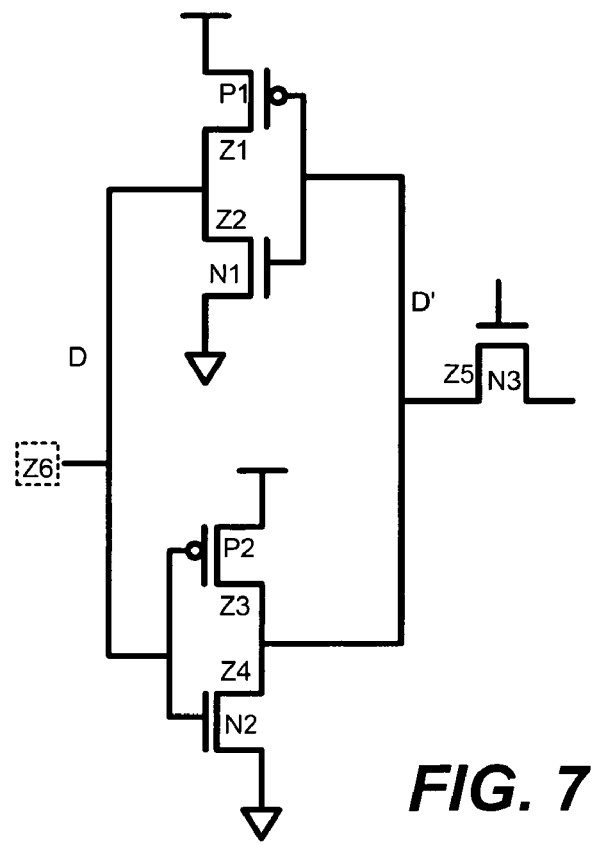
FIG. 7 shows a cell with a pass gate and an included balancing diffusion in accordance with some embodiments.

In addition, while cross-coupled inverter pairs, which are common in sequentials, register files and SRAM cells, have been primarily shown, the techniques can be applied for other situations, e.g., to prevent upsets in dynamic elements. In addition, glitches in combinatorial logic could be attenuated as well. Moreover, as indicated in FIG. 7, for circuits having unbalanced diffusions, i.e., a circuit such as that shown in FIG. 7 with two NMOS diffusions (Z4, Z5) at D' and only one NMOS diffusion (Z2) at D, one or more additional "balancing" diffusions may be added. In this circuit, an NMOS diffusion (Z6), coupled to D, is included to balance the D/D' N-type diffusions. It may be positioned in any suitable place, as just discussed regarding FIG. 6.

It should also be appreciated that while the disclosure has addressed positioning complementary diffusions next to each other, in addition to, or apart from such approaches, diffusions of different charge types at the same digital logic node may be disposed close to one another as well, to whatever extent is feasible. So, for example, with the circuit of FIG. 1, Z1 could be positioned closely to Z2, and Z3 could be positioned closely to Z4. Even though the ON device in such pairs may not collect charge (at least initially) as well as the associated OFF device, as discussed above, if they are close enough to receive comparable radiation, the ON device can possibly collect some charge that may be sufficient to thwart charge collection from the OFF device and prevent the logic node from flipping.

Since the approaches discussed herein are based on diffusions being physically close, they are inherently area efficient. Additionally, unlike with many other soft-error techniques, additional hardening circuitry (other than dummy devices and/or balancing diffusions, perhaps) need not be introduced. This makes the technique even more area and power efficient.

Figure 5:
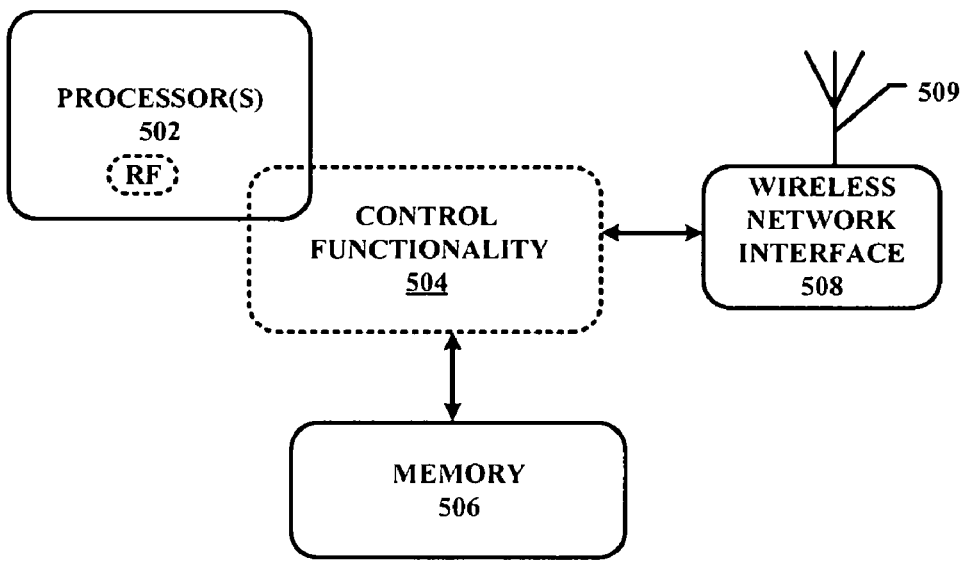
FIG. 5 is a block diagram of a computer system having a microprocessor with at least one register file with proximal complementary diffusion areas in accordance with some embodiments.

With reference to FIG. 5, one example of a portion of a platform (e.g., computing system such as a mobile personal computer, PDA, cell phone, or the like) is shown. The represented portion comprises one or more processors 502, interface control functionality 504, memory 506, wireless network interface 508, and an antenna 509. The processor(s) 502 comprises one or more register files (RF) with proximal complementary diffusion areas, as discussed herein. It is coupled to the memory 506 and wireless network interface 508 through the control functionality 504. The control functionality may comprise one or more circuit blocks to perform various interface control functions (e.g., memory control, graphics control, I/O interface control, and the like. These circuits may be implemented on one or more separate chips and/or may be partially or wholly implemented within the processor(s) 502.

The memory 506 comprises one or more memory blocks to provide additional random access memory to the processor(s) 502. It may be implemented with any suitable memory including but not limited to dynamic random access memory, static random access memory, flash memory, or the like. The wireless network interface 508 is coupled to the antenna 509 to wirelessly couple the processor(s) 502 to a wireless network (not shown) such as a wireless local area network or a cellular network.

The platform may implement a variety of different computing devices or other appliances with computing capability. Such devices include but are not limited to laptop computers, notebook computers, personal digital assistant devices (PDAs), cellular phones, audio and/or or video media players, and the like. It could constitute one or more complete computing systems or alternatively, it could constitute one or more components useful within a computing system.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical &intact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), graphics including graphics processors, memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip comprising:
a circuit with a dummy device disposed between first and second complementary diffusion areas to position said diffusion areas sufficiently proximal to one another,
wherein the dummy device is logically off by applying a supply voltage to its gate terminal, and wherein the dummy device has at least two diffusion areas shared with the first and second complementary diffusion areas respectively.

2. The chip of claim 1, wherein the dummy device is a dummy transistor.

3. The chip of claim 1, wherein the first and second complementary diffusion areas are part of a memory cell.

4. The chip of claim 1, wherein the first complementary diffusion area corresponds to a drain in an N-type transistor in a first inverter, and the second complementary diffusion area corresponds to a drain for an N-type transistor for a second inverter.

5. The chip of claim 1, wherein the first and second complementary diffusion areas are part of complementary access transistors for access to complementary data nodes.

6. The chip of claim 1, wherein the first and second complementary diffusion areas are separated by a distance of a minimum process dimension.

7. The chip of claim 1, wherein the dummy device has at least two diffusion areas shared with diffusion areas of adjacent transistors.

8. The chip of claim 1 further comprises:
another dummy device in the circuit, the other dummy device disposed between first and second complementary diffusion areas, wherein the other dummy device is logically off by applying ground to its gate terminal, and wherein the other dummy device has at least two diffusion areas shared with the first and second complementary diffusion areas respectively.

9. The chip of claim 2, wherein the dummy transistor is P-type transistor.

10. The chip of claim 3, wherein devices in the memory cell which are turned off are more reversed biased than the devices that are turned on.

11. The chip of claim 4, wherein the first and second N-type transistors are disposed on either side of a gate.

12. The chip of claim 8, wherein the other dummy device comprises an N-type transistor.

13. A method comprising:
   producing a circuit for an integrated circuit device, said producing including:
      disposing first and second complementary diffusion areas sufficiently proximal to one another; and
      disposing a dummy device between the first and second complementary diffusion areas,
   wherein the dummy device is logically off by applying a supply voltage to its gate terminal, and wherein the dummy device has at least two diffusion areas shared with the first and second complementary diffusion areas respectively.

14. The method of claim 13, wherein the first and second complementary diffusion areas comprise pairs of complementary diffusion areas.

15. The method of claim 13, comprising laying out a transistor so that the first and second complementary diffusion areas are separated by the dummy device.

16. A system comprising:
   a processor;
   a memory coupled to the processor, the memory comprising:
      a circuit with a dummy device disposed between first and second complementary diffusion areas to position said diffusion areas sufficiently proximal to one another, wherein the dummy device is logically off by applying a supply voltage to its gate terminal, and wherein the dummy device has at least two diffusion areas shared with the first and second complementary diffusion areas respectively; and
   a network interface for communicatively coupling the processor with other devices.

17. The system of claim 16, wherein the network interface is coupled to an antenna.

18. The system of claim 16, wherein the dummy device is a dummy transistor.

19. The system of claim 16, wherein the dummy transistor is P-type transistor.

20. The system of claim 16, wherein the first and second complementary diffusion areas are part of a memory cell.

21. The system of claim 16, wherein the first complementary diffusion area corresponds to a drain in an N-type transistor in a first inverter, and the second complementary diffusion area corresponds to a drain for an N-type transistor for a second inverter.

* * * * *

UNITED STATES PATENT AND TRADEMARK OFFICE
CERTIFICATE OF CORRECTION

| | | |
|---|---|---|
| PATENT NO. | : 8,278,692 B2 | Page 1 of 1 |
| APPLICATION NO. | : 12/589331 | |
| DATED | : October 2, 2012 | |
| INVENTOR(S) | : Ambrose et al. | |

It is certified that error appears in the above-identified patent and that said Letters Patent is hereby corrected as shown below:

In the Specification

In column 5, at line 38 delete, "&intact with" and insert -- contact with --.

Signed and Sealed this
Eighteenth Day of March, 2014

Michelle K. Lee
*Deputy Director of the United States Patent and Trademark Office*